(12) United States Patent
Matsuo

(10) Patent No.: US 10,574,842 B2
(45) Date of Patent: Feb. 25, 2020

(54) INFORMATION PROCESSING APPARATUS, METHOD OF CONTROLLING THE SAME AND NON-TRANSITORY COMPUTER-READABLE MEDIUM STORING INSTRUCTIONS THEREFOR

(71) Applicant: Brother Kogyo Kabushiki Kaisha, Nagoya-shi, Aichi-ken (JP)

(72) Inventor: Yu Matsuo, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/022,093

(22) Filed: Jun. 28, 2018

(65) Prior Publication Data

US 2019/0089851 A1 Mar. 21, 2019

(30) Foreign Application Priority Data

Sep. 15, 2017 (JP) .................................. 2017-178131

(51) Int. Cl.
*H04N 1/00* (2006.01)
(52) U.S. Cl.
CPC ..... *H04N 1/00482* (2013.01); *H04N 1/00167* (2013.01); *H04N 1/00421* (2013.01); *H04N 1/00424* (2013.01)
(58) Field of Classification Search
USPC .................................................. 358/1.1–3.29
See application file for complete search history.

(56) References Cited

U.S. PATENT DOCUMENTS

| 7,506,261 | B2* | 3/2009 | Satou | G09G 5/005 345/2.1 |
| 8,149,453 | B2* | 4/2012 | Tanaka | B41J 3/46 347/106 |
| 2010/0177330 | A1* | 7/2010 | Wu | H04N 1/00002 358/1.9 |
| 2016/0004939 | A1* | 1/2016 | Inoue | G06K 15/1809 358/1.12 |
| 2017/0289380 | A1* | 10/2017 | Oguchi | G06F 3/1219 |

FOREIGN PATENT DOCUMENTS

JP 2014-071584 A 4/2014

\* cited by examiner

*Primary Examiner* — Marcellus J Augustin
(74) *Attorney, Agent, or Firm* — Banner & Witcoff, Ltd.

(57) ABSTRACT

A non-transitory computer-readable medium for an information processing apparatus stores instructions realizing an edit screen control module, an image data creating module and a first device control module. The edit screen control module outputs first creation instruction information to the image data creating module, the image data creating module creates a display image data, and outputs the same to the edit screen control module, the edit screen control module displays the display image and outputs second creation instruction information to the image data creating module, the image data creating module creates the first output image data and outputs the same to the edit screen control module, the edit screen control module outputs first output instruction information to the first device control module, and the first device control module creates the second output image data corresponding to a selected device.

11 Claims, 6 Drawing Sheets

INFORMATION PROCESSING APPARATUS, METHOD OF CONTROLLING THE SAME AND NON-TRANSITORY COMPUTER-READABLE MEDIUM STORING INSTRUCTIONS THEREFOR

CROSS-REFERENCE TO RELATED APPLICATIONS

This application claims priority under 35 U.S.C. § 119 from Japanese Patent Application No. 2017-178131 filed on Sep. 15, 2017. The entire subject matter of the application is incorporated herein by reference.

BACKGROUND

Technical Field

The present disclosures relate to non-transitory computer-readable medium storing instructions for an information processing apparatus which is configured to communicate with an external device.

Related Art

When a printing process is performed by a printer connected to an information processing apparatus, typically, the information processing apparatus creates image data for printing (hereinafter, referred to as printing image data), and transmit the created printing image data to the printer, thereby the printing process of an image being performed based on the transmitted printing image data.

SUMMARY

Programs used by the information processing apparatus to create the printing image data is required to achieve various functions such as a function of displaying a preview image based on imaged data, a function of receiving user operations of print settings, a function of causing the printer to perform a print process and the like in addition to the function of creating the printing image data. Because of recent requirements as above, configurations of the programs have become complicated, and significantly large load has been generated for developing such programs.

According to aspects of the present disclosures, there is provided a non-transitory computer-readable medium for an information processing apparatus having a user interface, a network interface, a display and a controller, the non-transitory computer readable medium storing instructions realizing an edit screen control module, an image data creating module and a first device control module, the edit screen control module causing, when executed, the controller to output, when the controller receives an operation input through the user interface as an edit instruction input, first creation instruction information to the image data creating module, the first creation instruction information being information instructing creation of display image data, the display image data is image data indicating an image including an object edited in accordance with the edit instruction input, the image data creating module causing, when executed, the controller to create, in accordance with the first creation instruction information which is output as the controller is caused to output by the edit screen control module, the display image data and output the display image data to the edit screen control module, the edit screen control module causing, when executed, the controller to display, when the display image data which is created as the controller is caused to create by the image data creating module, is received after the first creation instruction information is output, the display image based on the display image data on the display. When the operation input received through the user interface after displaying the display image is a device usage instruction input, the controller outputs second creation instruction information to the image data creating module, the second creation instruction information being information instructing creation of first output image data corresponding to the display image data, the first output image data being image data used to create second output image data in the first device control module. Further, the image data creating module causes, when executed, the controller to create, in accordance with the second creation instruction information which is created as the controller is caused to output by the edit screen control module, the first output image data and output the first output image data to the edit screen control module. The edit screen control module further causes, when executed, the controller to output, when the first output image data which is output as the controller is caused to create by the image data creating module is received after the second creation instruction information is output, the first output instruction information to the first device control module, the first output instruction information being information instructing output of the second output image data, and the first device control module causes, when executed, the controller to create, in accordance with the first output instruction information which is output as the controller is caused to output by the edit screen control module, the second output image data corresponding to a selected device and output the second output image data to the selected device through the network interface, the selected device being a device selected as an output target of the second output image data from among a plurality of corresponding devices, the plurality of corresponding devices being a device to which the first device control module is conformable.

According to aspects of the present disclosures, there is provided a non-transitory computer-readable medium for an information processing apparatus having a user interface, a display and a controller, the non-transitory computer readable medium storing instructions realizing an edit screen control module, the controller being configured to read an image data creating module and a first device control module, the edit screen control module causing, when executed, the controller to output first creation instruction information instructing creation of display image data to the image data creating module when the controller receives an operation input through the user interface as an edit instruction input, the display image data is image data indicating an image including an object edited in accordance with the edit instruction input. The edit screen control module causes, when executed, the controller to: display the display image based on the display image data on the display when the display image data output by the image data creating module is received after the first creation instruction information is output. When the operation input received through the user interface is a device usage instruction input, the edit screen control module causes the controller to output second creation instruction information instructing creation of first output image data corresponding to the display image data created by the image data creating module to the image data creating module, the first output image data being image data used to create second output image data in the first device control module. When the first output image data output by the image data creating module is received after the second creation instruction information is output, the controller outputs the first output instruction information instructing output of the second output image data to the first device control module.

According to aspects of the present disclosures, there is provided a method of controlling an information processing apparatus having a user interface, a network interface, and a display. The method includes outputting, in response to receipt of an edit instruction input through the user interface, a-first creation instruction information instructing creation of display image data, the display image data being image data indicating an image including an object edited in accordance with the edit instruction input, creating, in accordance with the first creation instruction information, the display image data, displaying, when the display image data is received after the first creation instruction information is received, the display image based on the display image data on the display, and when the operation input received through the user interface after displaying the display image is a device usage instruction input, outputting second creation instruction information instructing creation of first output image data corresponding to the display image data used to create second output image data, creating, in accordance with the second creation instruction information, the first output image data and outputting the first output image data, outputting, when the first output image data is output after the second creation instruction information is output, the first output instruction information instructing output of the second output image data, and creating, in accordance with the first output instruction information, the second output image data corresponding to a selected device and outputting the second output image data to the selected device through the network interface, the selected device being a device selected as an output target of the second output image data from among a plurality of corresponding devices, the plurality of corresponding devices being a device to which the first device control module is conformable.

According to aspects of the present disclosures, there is provided an information processing apparatus having a user interface, a network interface, a display, a memory and a controller, the memory storing programs realizing an edit screen control module, an image data creating module and a first device control module. The edit screen control module causes, when executed, the controller to output, when the controller receives an operation input through the user interface is as an edit instruction input, a first creation instruction information to the image data creating module, the first creation instruction information begin information instructing creation of display image data, the display image data is image data indicating an image including an object edited in accordance with the edit instruction input. The image data creating module causes, when executed, the controller to create, in accordance with the first creation instruction information which is output as the controller is caused to output by the edit screen control module, the display image data and output the display image data to the edit screen control module. The edit screen control module causes, when executed, the controller to display, when the display image data which is created as the controller is caused to create by the image data creating module, is received after the first creation instruction information is output, the display image based on the display image data on the display. When the operation input received through the user interface after displaying the display image is a device usage instruction input, the controller outputs second creation instruction information to the image data creating module, the second creation instruction information being information instructing creation of first output image data corresponding to the display image data, the first output image data being image data used to create second output image data in the first device control module. The image data creating module causes, when executed, the controller to create, in accordance with the second creation instruction information which is created as the controller is caused to output by the edit screen control module, the first output image data and output the first output image data to the edit screen control module. The edit screen control module causing, when executed, the controller to output, when the first output image data which is output as the controller is caused to create by the image data creating module is received after the second creation instruction information is output, the first output instruction information to the first device control module which is information instructing output of the second output image data. The first device control module causes, when executed, the controller to create, in accordance with the first output instruction information which is output as the controller is caused to output by the edit screen control module, the second output image data corresponding to a selected device and output the second output image data to the selected device through the network interface, the selected device being a device selected as an output target of the second output image data from among a plurality of corresponding devices, the plurality of corresponding devices being devices to which the first device control module is conformable.

BRIEF DESCRIPTION OF THE ACCOMPANYING DRAWINGS

DESCRIPTION OF THE EMBODIMENT

<Configuration of Printer System>

Hereinafter, referring to the accompanying drawings, a printer system 1 according to an illustrative embodiment will be described. It is noted that the embodiment described hereinafter is only an illustrative embodiment and can be modified in various ways without departing from the aspects of the present disclosures. For example, an order of steps of processes described later can be changed without changing the aspects of the disclosures.

Figure 1:
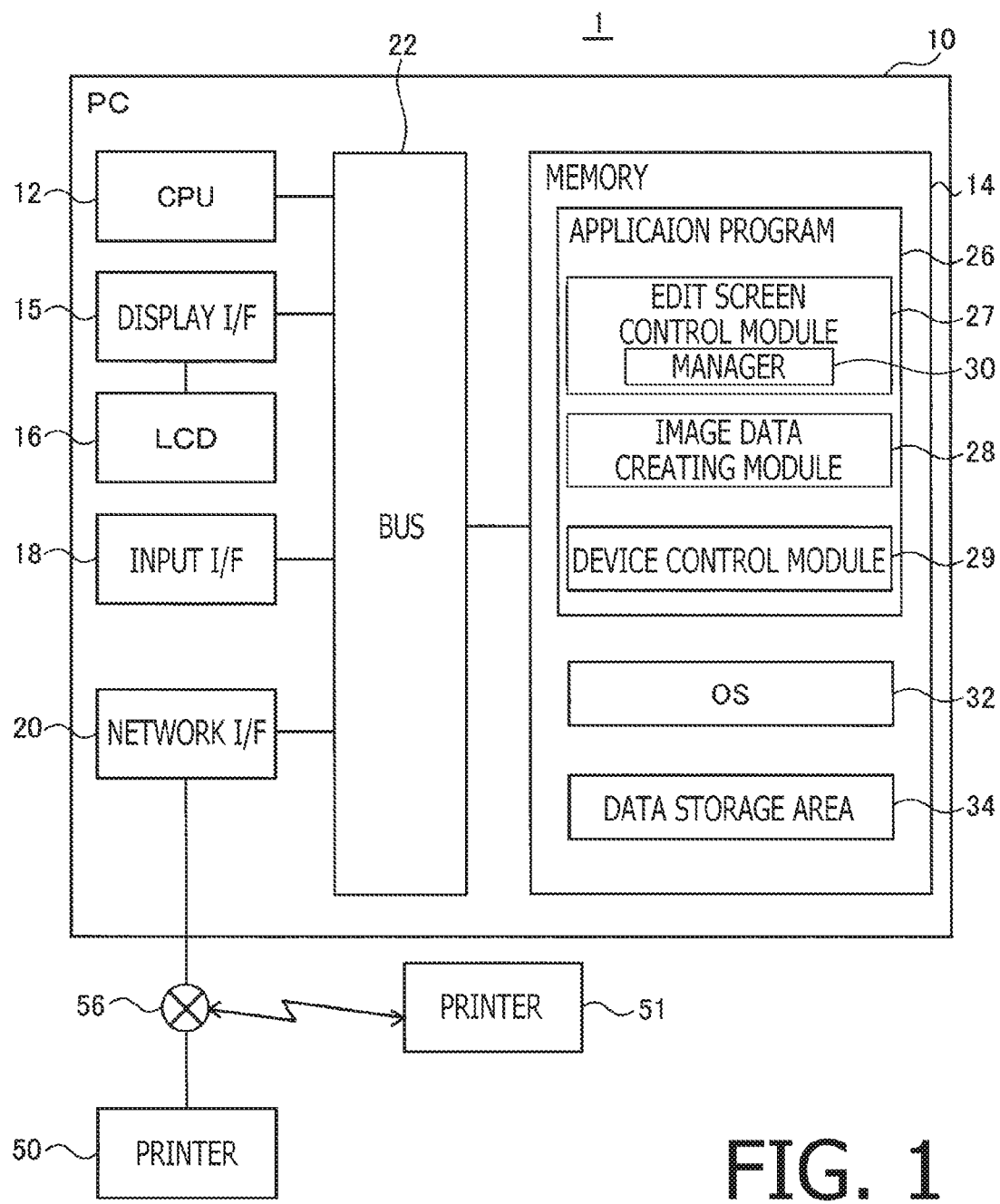
FIG. 1 is a block diagram of a printer system according to an illustrative embodiment of the present disclosures.

The printer system 1 according to the illustrative embodiment shown in FIG. 1 is provided with a PC (an example of an information processing apparatus) 10, a printer 50 and another printer 51. The PC 10 mainly has a CPU (an example of a controller) 12, a memory 14, a display I/F (an example of an interface and a display) 15, an LCD (an example of a user interface) 16, an input I/F (an example of a user interface) 18, and a network I/F (an example of a network interface) 20. The components of the PC 10 as mentioned above are interconnected through a bus 22 so as to communicate with each other.

The PC 10, the printers 50 and 51 can communicate with each other through a network I/F 20 and a network 56. As a communication method, a wired LAN, a USB, Wi-Fi® or Bluetooth® may be employed.

The printers 50 and 51 are, for example, label printers configured to transmit/receive various pieces of information or instruction signals to create item labels on which desired texts and images are printed, under control of the PC 10. For example, the printers 50 and 51 are configured to create the item labels by printing texts and images on a tape-type medium such as a long laminated film.

The CPU 12 executes operations in accordance with application program 26 (an example of a program) and OS 32 stored in the memory 14. The application program 26 is for creating the labels with user of the printers 50 and 51. The application program 26 includes, as processing modules, an edit screen control module 27, an image data creating module 28 and a device control module 29. The edit screen control module 27 is provided with a manager 30. It is noted that the application program 26 may not be configured with an aggregate of a plurality of program modules as above, but may be configured as a single program.

The OS 32 is a program providing basic functions which are used by the application program 26. The OS 32 is, for example, an operation system such as Windows®, MacOS®, Linux®, Android®, iOS® and the like. In the following description, the CPU 12 executing a program such as the application program 26 may be referred to simply by the name of the program being executed. For example, an expression "the application program 26 performs an operation" may mean "the CPU 12 executing the application program 26 performs an operation" or "the application program 26 causes the CPU 12 to perform an operation."

Figure 2:
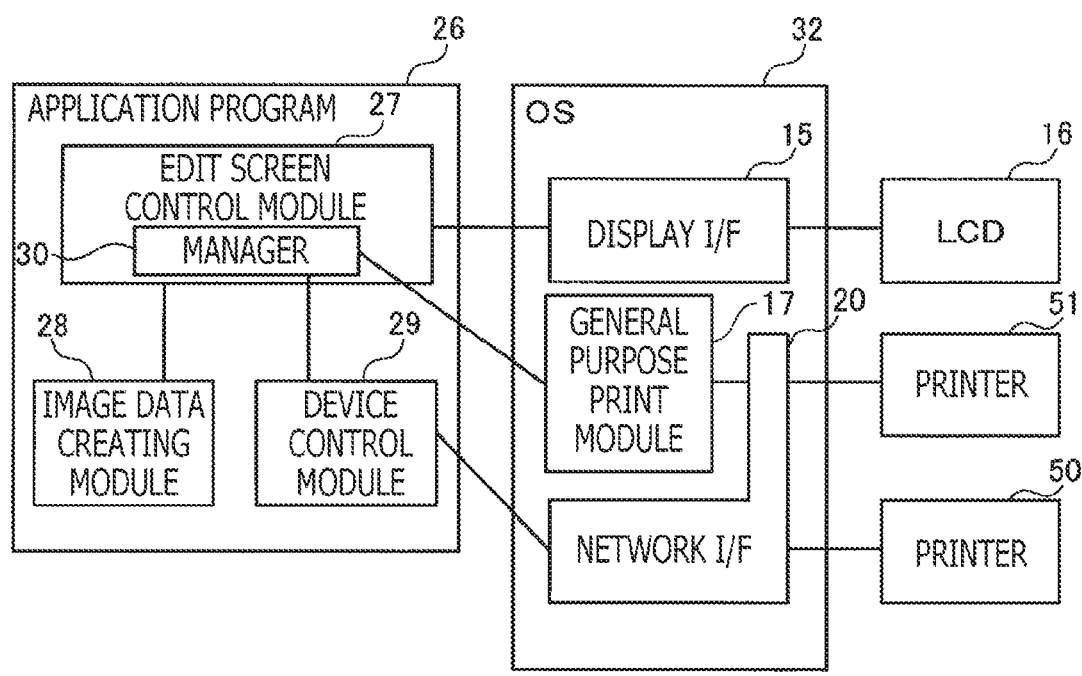
FIG. 2 is a block diagram schematically illustrates a relationship between an application program, OS and devices connected to through a network I/F.

FIG. 2 schematically shows a relationship among various program modules and devices. For example, the edit screen control module 27 is for displaying, on the LCD 16, an edit screen used to create or edit labels. The edit screen control module 27 executes display instructions on the OS 32 using API provided by the OS 32, and performs a display process using a displaying program provided by the OS 32. The OS 32 controls the display I/F 15 in accordance with the display instruction output by the edit screen control module 27 to display the edit screen on the LCD 16.

The edit screen control module 27 instructs the image data creating module 28 to create image data indicating an image for displaying an object representing a label subject to edition. Then, the edit screen control module 27 receives the image data created by the image data creating module 28 therefrom, and displays an image based on the received image data on the LCD 16.

The object here means a text, figures (e.g., a circle, a square and the like) and images which configure the label. In response to receipt of an input operation to edit an object from the input I/F 18, the edit screen control module 27 instructs the image data creating module 28 to create image data representing the image for displaying the edited objects on the edit screen. Edition of objects includes addition and deletion of object, change of sizes of an objects, changing positions (i.e., relocation) of objects, change of text, change of colors and the like.

The edit screen control module 27 instructs the image data creating module 28 to create image data representing the image of the label edited in the edit screen in order to print the label image with the printer. Then, the edit screen control module 27 receives the image data created by the image data creating module 28 therefrom.

Then, the edit screen control module 27 delivers the received image data to the device control module 29 together with a print instruction so that the label is printed by the printer 50 or the printer 51.

It is noted that the edit screen control module 27 causes the printer 50 or 51 to output the label by delivering the image data received from the image data creating module 28 and the print instruction to the general purpose print module 17 provided to the OS 32. An example of the general purpose print module 17 is AirPrint® implemented in the MacOS. The general purpose print module 17 transmits the print instruction of the image data received from the edit screen control module 27 to a printer (which may be the printer 50 or 51) conformable to the general purpose print module 17 through the network I/F 20.

The image data creating module 28 is a program which is provide with libraries for creating and editing image data to create a label, and executes creating or editing the image data. In accordance with an instruction transmitted form the edit screen control module 27, the image data creating module 28 creates the image data for displaying the label on the LCD 16 or the image data for causing the printer 50 or 51 to print the image indicating the label.

Figure 7:
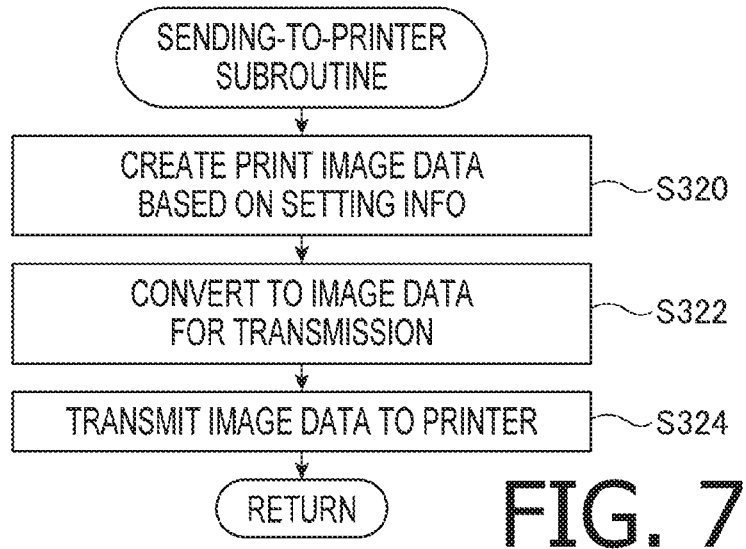
FIG. 7 is a flowchart illustrating a sending-to-printer subroutine.

The device control module 29 is a program causing the printer 50 to perform printing through the network I/F 20. The control module 29 causing the printer 50 or 51 to print the image showing the label by, for example, receiving the image data representing the image to cause the printer to print the label and the print instruction from the edit screen control module 27, converting the received image data to the print image data used for printing in accordance with the received print instruction, and transmitting the converted print image data to the printer 50 or 51 as shown in FIG. 7.

The memory 14 has a data storage area 34, which is for storing data necessary for execution of the application program 26. According to the illustrative embodiment, the memory 14 is configured by one of, or all or some of a combination of a RAM, ROM, a flash memory, an HDD, a portable storage medium such as a USB memory attached to the PC 10, and a buffer provided to the CPU 12.

It is noted that the memory 14 may be a computer-readable storage medium. The computer-readable storage medium is a non-transitory medium. The non-transitory medium includes, in addition to the computer-readable storage medium above, a recording medium such as a CD-ROM, a DVD-ROM and the like. It is also noted that the non-transitory medium is a tangible medium. In contrast, an electrical signal carrying programs downloaded from a server on the Internet or the like is a computer-readable signal medium, which is one type of a computer-readable medium, is not included in the non-transitory computer-readable storage medium.

The LCD 16 displays various pieces of information regarding the PC 10. The LCD 16 is connected to the bus 22 via the display I/F 15, and obtains display data through the I/F 15. It is noted that, according to the illustrative embodiment, the display need not be limited to the liquid crystal display, but other type of display (e.g., ELED: organic light emitting display) can be employed.

The input I/F 18 is an interface through which the user operations are input, and includes a keyboard and a mouse.

It is noted that the input I/F 18 needs not be limited to the keyboard or the like, and may include a film-type touch sensor overlaid on a display screen of the LCD 16.

<Operation Sequence of Creation of Label>

A vender of the application program 26 is required to deal with a significantly large number of devices. On the other hand, depending of kinds of devices, assumed usages, assumed users, printing performances (e.g., sheet types, sheet sizes, resolutions, print colors), communication performances, control methods (e.g., control command systems, the number of compatible commands) are different. In the following description, a term "sheet" will be used to represent a printing medium. That is, the term "sheet" used in the following description is not intended to only a sheet of paper, but the term "sheet" may include resin, cloth, metal, glass, wood, fiber and the like.

Examples of the devices to which the vendor may be required to deal with are the printers 50 and 51, and not-shown printers A, B, C and D. The application program 26 is a program to edit an image, and provide each of the devices (e.g., printers 50, 51, A-D) with image formation data for causing each device to form the edited image.

According to the illustrative embodiment, the printer 50 is a home-use label printer. The printer 50 is configured such that a cartridge containing a label-type sheet of which width ranges from 6 mm to 36 mm is detachably attached, and printing can be performed on the sheet accommodated in the cartridge. A printing resolution of the printer 50 is 180 dpi, and the printer 50 is configured to print a monochromatic image. The printer 50 is intended to create labels which are to be attached onto ordinary places (e.g., on furniture, stationeries and the like) to indicate cautionary notices, names and the like. Accordingly, the printer 50 is only required to print letters and characters, simple symbols and simple illustrations. According to the illustrative embodiment, the printer 50 is configured to communicate with other devices through Wi-Fi.

According to the illustrative embodiment, the printer 51 is a professional-use printer. The printer 51 is configured such that a cartridge containing a label-type sheet of which width ranges from 15 mm-102 mm is detachably attached, and printing can be performed on the sheet accommodated in the cartridge. A printing resolution of the printer 51 is 300 dpi, and the printer 51 is configured to print a monochromatic image. The printer 51 is intended to create food labels to be attached onto food containers. Therefore, the printer 51 is required to print letters and characters, enclosing lines, table-type layout, and is required to print a large number of same labels continuously. It is noted that the printer 51 is configured to communicate with other devices through any of Wi-Fi, the wired LAN and the USB.

The printer A is a page printer, and configured to print on cut sheets of which size ranges from B5 size-A4 size. The print resolution of the printer A is 1200 dpi, and the printer A is configured to perform color printing. Further, the printer A is intended to perform common official printing. The printer A is a device configured to communicate with other devices through either Wi-Fi or USB.

The printer B is a label printer for printing ornamental labels, and configured to print on a label of which size ranges from 3.5 mm-12 mm Since it is necessary to create various colors of labels for ornamentations, and the number of kinds of labels is significantly large in comparison with the labels corresponding to the printers 50 and 51. The print resolution of the printer B is 180 dpi, and the printer B is configured to perform monochromatic printing. The printer B is intended to create ornamental labels such as masking tapes, and thus assumed to print continuous pictures as a pattern on a ribbon. The printer B is configured to communicate with other devices through Wi-Fi.

The printer C is a metal working or a wood working printer, and is configured to print images on a surface of such a printing medium (e.g., metal, wood or glass member). An image formation method may be one utilizing a laser beam. The printer C is configured to communicate with other devices through USB.

The printer D is a professional-use label printer planned to be developed, and is configured to perform printing on a label of which size ranges from 23 mm-62 mm. The print resolution of the printer D is 600 dpi, and the printer D is configured to perform three-color printing. The printer D is assumed to create labels which are to be attached on containers of items. The printer D is a device configured to communicate with other devices through Wi-Fi and Bluetooth. The vendor of the application program 26 may be required to be conformable to devices (e.g., a tree-D printer or a machining tool) configured to reproduce a three-dimensional image represented by image formation data.

When an application for a new model to be released is to be designed as above, it is necessary that all of the intended use, the assumed users, the printing performance, the communication performance, the control method and the like should be taken into account, and to design such an application is very laborious. According to the illustrative embodiment, in order to reduce the laborious work in designing the application, a module realizing an appropriate user I/F applicable to as many assumed usages as possible and as many assumed users possible (i.e., the edit screen control module 27), a module realizing creation of image data conformable to as many printing performances as possible (i.e., the image data creating module 28), and a module realizing the communication process and control conformable to as many kinds of communication performances and control methods as possible are designed respectively, and the three modules are integrated into on application.

By employing such a designing method, it becomes possible to assign different human resources for designing respective modules such that a plurality of modules are designed in parallel.

For example, when an application for a new model of which the assumed usage and the assumed users are new, but the print and communication performances are substantially the same as the conventional one is to be developed, the human resources for development may be assigned only to update-designing of the edit screen control module 27. Then, simply by integrating the edit screen control module 27 on which the update-designing has been performed, the slightly modified image data creating module 28 and the slightly modified device control module 29, the application for the new model can be designed. Such a design policy will be referred to as a design policy 1.

According to another example, the human resources for development may be assigned only to newly design the edit screen control module. Then, by integrating the newly designed edit screen control module, the slightly modified image data creating module 28 and the slightly modified device control module 29, the application for the new model can be designed. Such a design policy will be referred to as a design policy 2. As described above, the design policy 1 or 2 can be used. Further, flexibility of design can be obtained since either of the design policies 1 and 2 can be used for design the new application.

When an application for the MacOS having the substantially the same specification of the application of the Windows is to be designed, by simply modifying only portions related to the user I/F of the edit screen control module 27, by slightly modifying only portions related to image rendering, and by slightly modifying only portions related to the communication to meet the MacOS, the application for the MacOS can be obtained.

When, for example, a new model having the assumed usage, the assumed users and the printing performance which are substantially the same as those of a conventional model, and the communication performance the same as that of the conventional model, and is further configured to communicate with other devices through a new communication method which is different from one employed in the conventional model is to be released, an application which is a combination of the slightly modified edit screen control module 27, the slightly modified image data creating module 28, and the slightly modified device control module 29 may be initially released so that the users can use the new model. Then, after designing the image data creating module capable of communicating other devices with the new communication method by assigning appropriate human resources, a new application which is a combination of the newly designed device control module 29, the slightly modified conventional edit screen control module 27 and the slightly modified conventional image data creating module 28 may finally be released.

Figure 3:
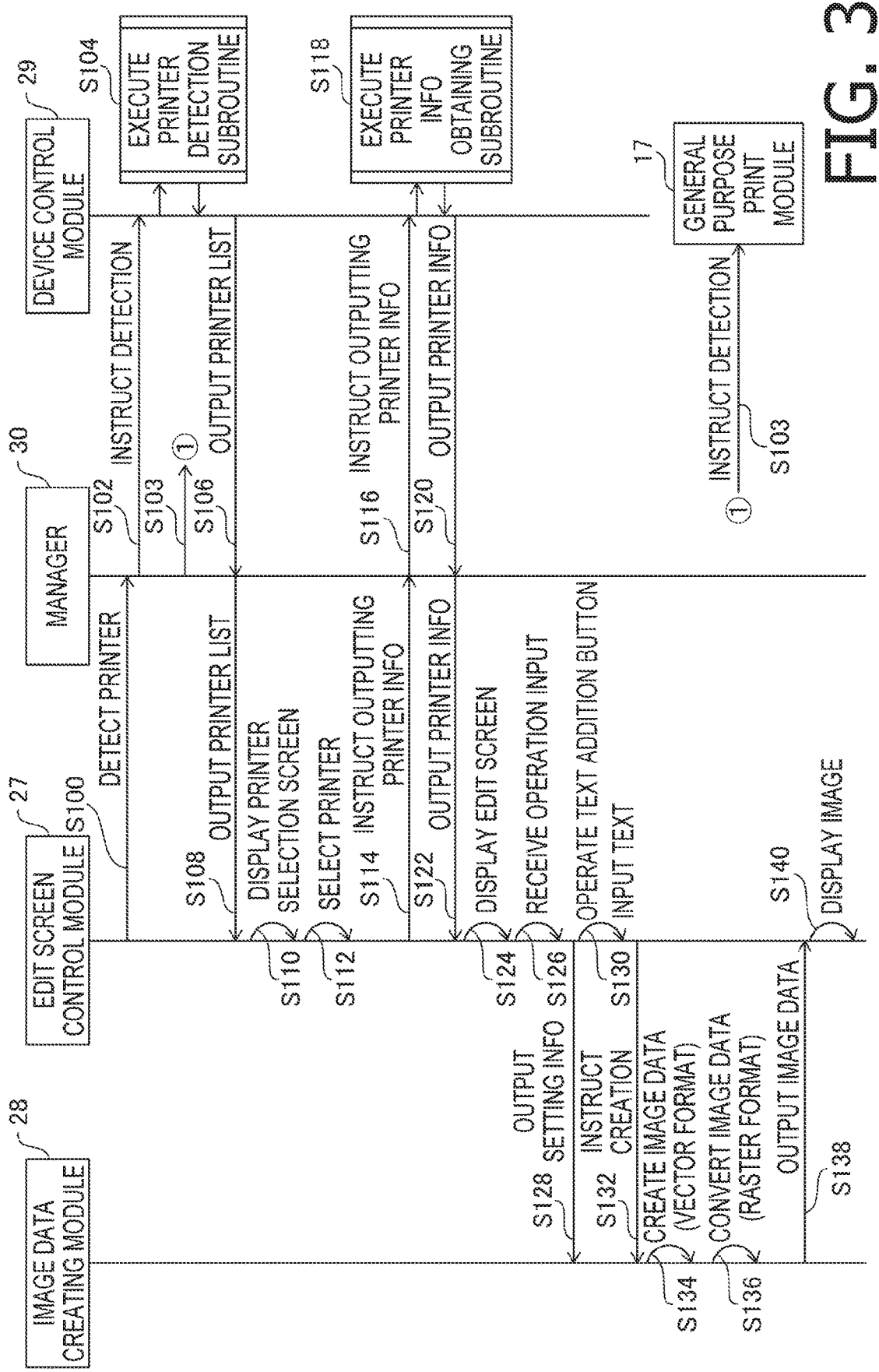
FIG. 3 shows an operation sequence when printing image data is created.
Figure 4:
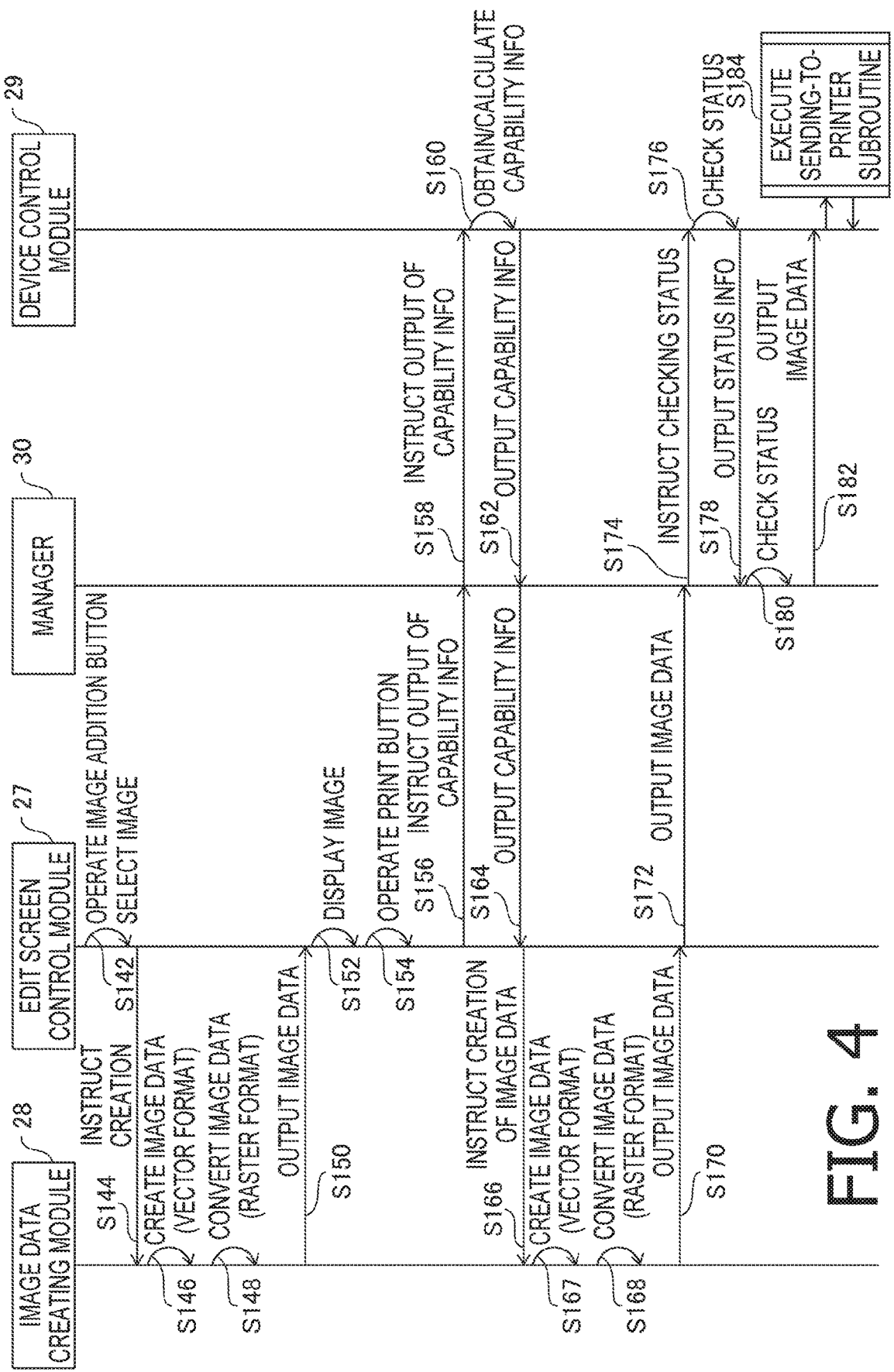
FIG. 4 shows an operation sequence when printing image data is created.
Figure 5:
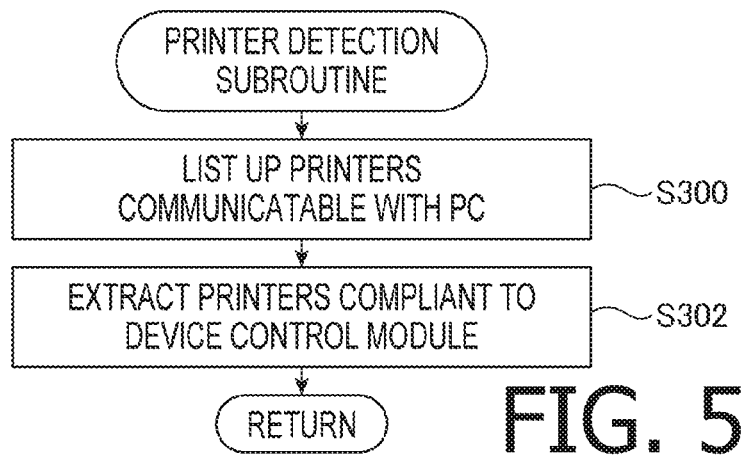
FIG. 5 is a flowchart illustrating a printer detection subroutine.
Figure 6:
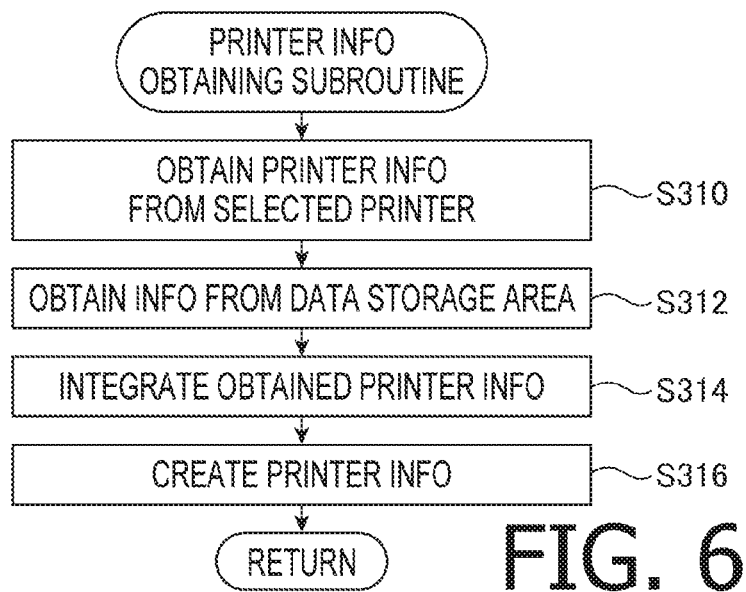
FIG. 6 is a flowchart illustrating a printer information obtaining subroutine.

An operation sequence of the application program 26 as mentioned above will be described. FIGS. 3 and 4 are sequence charts illustrating the operation sequences for creating the label. FIGS. 5-7 are flowcharts illustrating subroutines referred to in the sequence charts. In the following description, the application 26 using the printers 50 and 51 as target printers will be explained for explaining purpose. Basic operations of the applications corresponding to other printers are substantially the same as those of the application 26 which is directed to the printers 50 and 51. It should be noted that the application corresponding to the other printers is provided with a module (e.g., an edit screen control module) realizing a user I/F suitable to the assumed usage and the assumed users of the other printers, a module (e.g., an image data creating module) realizing creation of image data corresponding to the printing performances of the other printers, and a module (e.g., a device control module) realizing communication processes or control corresponding to the communication performances and control methods of the other printers.

The sequence charts basically show processes of the CPU 12 in accordance with instructions scripted in the programs. Processes indicated by terms "determine", "extract", "select", "calculate", "judge", "identify", "obtain", "receive", "control", and "set" are the processes of the CPU 12. It is noted that the processes executed by the CPU 12 include a hardware control through the OS 32. It is further noted that the term "obtain" will be used to mean a concept in which a request is not necessary. That is, a process in which the CPU 12 receive data without requesting for the same is included in a concept that the CPU 12 obtains the data. Further, a term "data" in the specification is represented by a computer-readable bit array. A plurality of pieces of data having substantially the same meaning or contents but different formats will be treated as the same data. A term "information" used in the specification will be treated in the same manner. Further, the processes of "instruct", "respond" and "request" are executed by communicating information or data indicating "instruct", "respond" and "request", respectively. Furthermore, the terms "instruct", "respond" and "request" may be stored as information or data meaning "instruct", "respond" and "request", respectively.

When the application program 26 is started, the edit screen control module 27 outputs a detection instruction to detect printers communicatable with the PC 10 to the manager 30 (FIG. 3: S100). In response to receipt of the detection instruction, the manager 30 outputs the detection instruction of the printer to the device control module 29 (S102). The manager 30 transmits the detection instruction not only to the device control module 29, but to the general purpose print module 17 of the OS 32 (S103). In the following description, a process after the manager 30 outputs the detection instruction to the device control module 29 will be explained, and thereafter a process after the manager 30 outputs the detection instruction of the printer to the general purpose print module 17 will be described.

In response to receipt of the printer detection instruction from the manager 30, the device control module 29 executes a printer detection subroutine (S104). In the printer detection subroutine, the device control module 29 detects and lists printers communicatable with the PC 10 as shown in FIG. 5 (S300). At this stage, the device control module 29 lists basic printer information indicating two printers: the printer 50 and the printer 51. The basic printer information includes printer identifying information to identify a printer, and model information indicating a model of the printer. The printer identifying information can be any information with which a printer can be identified uniquely (e.g., an IP address, a MAC address or the like). If the printer can be uniquely identified, a nickname of the printer can be used as the printer identifying information. Thereafter, the device control module 29 extracts basic printer information indicating a printer conformable to the device control module 29 is configured to control (S302).

It is noted that a printer conformable to the device control module 29 means a printer of a certain model from which the device control module is capable of obtaining printer information by executing a printer information obtaining subroutine, and is selected by the vendor of the device control module selects as a target from which the printer information is to be obtained. The device control module extracts the printer information by executing a process of communicating a printer using a communication protocol communicatable with the printer, a process of extracting the printer information from among data received by the communication, and the like. It is also noted that all the models of printers from which the device control module can obtain printer information are not indicated in conformable model information, but only the models selected by the vendor of the device control module are indicated. For example, the conformable model information is designed such that models of vendors different from the vendor of the device control module are not indicated.

Concretely, the device control module 29 obtains conformable model information indicating a model of the printer conformable to the device control module 29, and extracts the basic printer information including the conformable model information from among the listed pieces of basic printer information. The device control module 29 may obtain the conformable model information by retrieving conformable model information, which was stored in the memory 14 when the device control module 29 was installed to the PC 10 from the memory 14. Alternatively, the conformable model information may be included in cods of the device control module 29. Further, the device control module 29 may obtain the conformable model information by loading the same included in the codes of the device control module 29 in a buffer.

Generally, the newer the version of the device control module 29, the more the number of models that are conformable to the device control module 29. For example, version one of the device control module 29 may obtain the conformable device information indicating ten models, while version two of the device control module 29 may obtain the conformable device information indicating twelve models. According to the illustrative embodiment, the device control modules 29 is conformable to the printer 50 but is not conformable to the printer 51. Therefore, the device control module 29 extracts the basic printer information of the printer 50 from among the basic printer information of both the printer 50 and the printer 51. Hereinafter, a process of extracting the basic printer information, or a process of extracting the printer information will occasionally be described as a process of extracting a printer.

The device control module 29 outputs the list of the basic printer information extracted in S302 to the manager 30 (FIG. 3: S106). In the following description, the list of the basic printer information will also be referred to simply as "a printer list." The manager 30 outputs the printer list to the edit screen control module 27 (S108). The edit screen control module 27 displays a printer selection screen for selecting a printer on the LCD 16 based on the received printer list (S110). It is noted that the edit screen control module 27 also receives the basic printer information from the general purpose print module 17 through the manger 30, which will be described in detail later. The edit screen control module 27 merges the list obtained from the general purpose print module 17 and the list obtained from the device control module 29, and displays the printer selection screen based on the merged list. That is, the printer selection screen is a screen on which any of the printers indicated by the basic printer information included in the list obtained from the general purpose print module 17 and the printers indicated by the basic printer information included in the list obtained from the device control module 29 can be selected.

When a user selects an arbitrary one of the printers on the printer selection screen (S112), the edit screen control module 27 outputs an output instruction instructing the manager 30 to output the printer information (which is an example of device information) indicating the selected printer (which is an example of a selected device) to the edit screen control module 27 (S114). It is noted that the basic printer information indicating the selected printer is included in the output instruction.

When the manager 30 received the output instruction of the printer information from the edit screen control module 27, and when the basic printer information output by the device control module 29 is included in the output instruction, the manager 30 outputs the output instruction of the printer information to the device control module (S116). Then, when the output instruction of the printer information is received, the device control module 29 executes the printer information obtaining subroutine (S118).

In the printer information obtaining subroutine, the device control module 29 communicates, through the network I/F 20, with the selected printer using the printer identifying information included in the basic printer information of the selected printer as shown in FIG. 6, and obtains dynamic printer information from the selected printer (S310). Further, the device control module 29 obtains static printer information corresponding to the model information included in the basic printer information of the selected printer (S312). When the device control module 29 is installed, the model information indicating the models conformable to the device control module 29, and the static printer information indicting static information of each model may be stored in the data storage area 34 in an associated manner. The device control module 29 may obtain the static printer information corresponding to the model information of the selected printer by reading the same from the data storage area 34. The static printer information may be included in the codes of the device control module 29. The device control module 29 may obtain the static printer information by loading the same corresponding to the model information of the selected printer included in the code. It is noted that the static printer information is, for example, sizes of sheets printable by the selected printer, and will not be changed even if the status of the printer is dynamically changed. On the other hand, the dynamic printer information obtained from the selected printer is, for example, the size of the sheets currently set to the selected printer, and the value of which is changed or updated when the status of the printer dynamically changes.

The device control module 29 integrates the basic printer information of the selected printer, the obtained static printer information and the dynamic printer information (S314) to create the printer information of the selected device (S316). That is, the printer information includes the basic printer information of the selected printer, the static printer information and the dynamic printer information.

Figure 8:
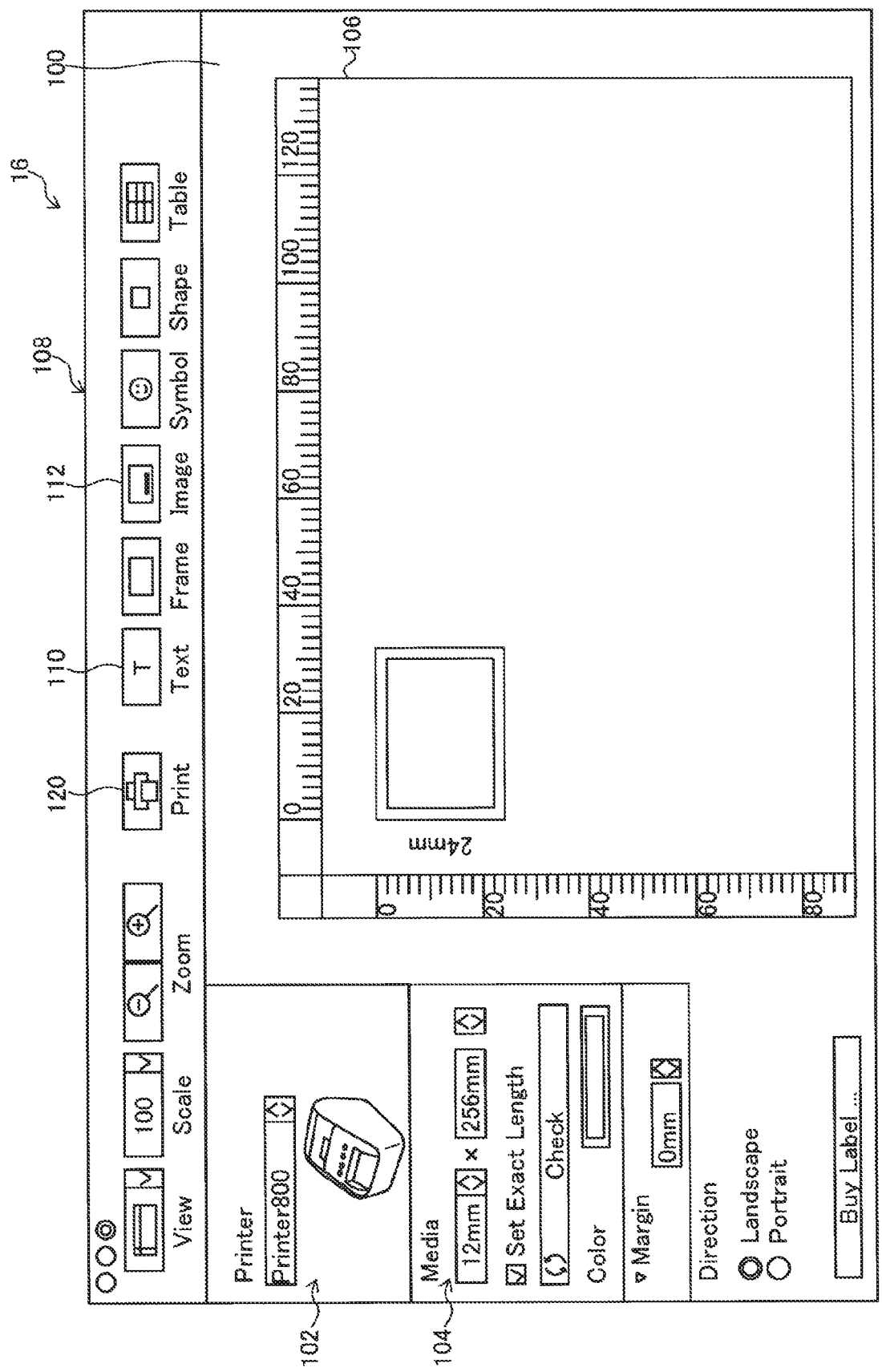
FIG. 8 shows an example of an edit screen according to the illustrative embodiment.

The device control module 29 outputs the printer information created in S316 to the manager 30 (FIG. 3: S120). Then, the manager 30 outputs the printer information to the edit screen control module 27 (S122). The edit screen control module 27 displays an edit screen 100 as shown in FIG. 8 on the LCD 16 based on the received printer information (S124). On the edit screen 100, a printer area 102 displaying an image indicating characteristics of the selected printer and a setting area 104 displaying print conditions settable by the selected printer are displayed. It is noted that the edit screen control module 27 mainly displays the printer area 102 based on the basic printer information and the static printer information included in the printer information received in S122. In the example shown in FIG. 8, the printer information 102 includes an appearance image of the selected printer, and model information (e.g., "printer 800"). Further, the edit screen control module 27 displays the setting area 104 based on the printer information received in S122.

The setting area 104 includes a setting field for setting a size and the like of a print-target sheet, a setting field for setting print resolution, a setting field for setting a size of a margin when printing is performed, and the like. The edit screen control module 27 receives user operations on the setting fields through the OS 32. When receiving the operation input on the setting fields (S126), the edit screen control module 27 stores setting information corresponding to the operation input on the setting fields (e.g., the print resolution, the margin size when printing, the parameters regarding the sheet size and the like) in the memory 14. Further, the edit screen control module 27 outputs the setting information to the image data creating module 28 (S128).

Although not shown in detail in the drawings, the edit screen control module 27 displays an image including an object having the size and background color indicated by the setting information on a preview area 106. Concretely, when a creation instruction to create image data including a label object is received, the image data creating module 28 creates the image data in accordance with the creation instruction, and outputs the created image data to the edit screen control module 27. The edit screen control module 27 obtains the image data output by the image data creating module 28, and displays the image including the label object on the preview screen 106. Although not shown in the drawing, the edit screen control module 27 is always ready to receive operation input on the setting fields as displayed, and executes steps S126-S128 at every receipt of the operation input.

On the edit screen 100, additional button field 108 including a plurality of object addition buttons to add objects to be printed by the selected printer is displayed. The object addition buttons includes a text addition button 110 to add text as an object, an image addition button 112 to add an image as an object, and the like.

When the test addition button 110 is operated, and a text is input by a following operation (S130), the edit screen control module 27 outputs the creation instruction of the image data representing an image including the text object to the image data creating module 28 (S132). The creation instruction of the image data includes information designating the input text, information related to coordinates of the input text and the like. When receiving the creation instruction of the image data, the image data creating module 28 creates, in S134, image data for display (hereinafter, referred to as display image data: which is an example of display image data) based on the information included in the creation instruction of the image data and the setting information received in S128. That is, the image data creating module 28 creates the image data of the edited image in response to the operation of the text addition button 110.

It is noted that term "edited image" includes an image to which some objects have been added, an image in which object sizes have been changed, an image in which positions of objects have been changed and the like. In this case, the image data creating module 28 creates vector format image data for rendering a text designated by the information included in the creation instruction at coordinates included in the creation instruction on the sheet having the size corresponding to the setting information.

Next, the image data creating module 28 converts the created vector format image data to raster format image data (S136). Then, the image data creating module 28 outputs the raster format image data to the edit screen control module 27 (S138). Upon receipt of the image data, the edit screen control module 27 displays an image based on the received image data on the preview area 106 (S140).

When, on the edit screen 100, the image addition button 112 is operated, and an image is selected (e.g., an image file containing the image data is selected) by the following operation (FIG. 4: S142), the edit screen control module 27 outputs the creation instruction of the image data representing the image to the image data creating module 28 (S144). The creation instruction includes information designating the selected image, information related to the coordinates of an insertion position of the image and the like. Upon receipt of the image data creation instruction, the image data creating module 28 creates the image data for display (which is an example of the image data for display) based on the information included in the creation instruction and the setting information received in S128 (S146). That is, the image data creating module 28 creates the image data of the edited image by the operation of the image addition button 112. At this stage, the image data creating module 28 creates the image data for rendering an image designated by the information included in the addition instruction on the sheet having the size corresponding to the setting information at a position included in the creation instruction in the vector format.

Next, the image data creating module 28 converts the created vector format image data to the raster format image data (S148). Then, the image data creating module 28 outputs the raster format image data to the edit screen control module 27 (S150). Upon receiving the image data, the edit screen control module 27 displays the image based on the received image data (S152).

On the edit screen 100, a print button 120 is also displayed (FIG. 8). When the print button 120 is operated (S154), the edit screen control module 27 outputs an output instruction which instructs the edit screen control module 27 to output capability information of the selected printer to the manager 30 (S156). The capability information indicates capability when the printer executes the print process. Specifically, the capability information includes information related to the margin size and the print resolution which are necessary when the print process is performed. The edit screen control module 27 outputs the setting information related to the print setting to the manger 30 in association with the output instruction of the capability information. Concept of the term "association" may include concept of incorporating information B into information A. Further, the concept of association may include concept of outputting information B together with information A. In this case, information related to the print setting, which information is to be output, may be the information related to the print resolution, the margin size and the like, which are stored in the memory 14 by the edit screen control module 27 in S126. The edit screen control module 27 retrieves the setting information stored in the memory 14 and outputs the same to the manager 30.

Upon receipt of the output instruction of the capability information from the edit screen control module 27, the manger outputs the output instruction of the capability information to the device control module 29 (S158). Then, in response to receipt of the output instruction of the capability information, the device control module 29 communicates with the selected printer through the network I/F 20, and obtains, from the selected printer, information indicating a plurality of resolutions and a plurality of margin sizes usable by the selected printer (S160). Then, the device control module 29 calculates or selects the resolution and the margin size corresponding to the resolution and the margin size indicated by the setting information output in association with the output instruction based on the resolutions and the margin sizes as the resolution and the margin size at the time of printing (S160).

It is noted that the resolution and the margin size indicated by the setting information meet the resolutions and the margin sizes usable by the selected printer, the corresponding resolution and the margin size for printing are determined by selection. If the resolution or the margin size indicated by the setting information does not completely meet the resolutions and the margin sizes usable by the selected printer, the resolution and the margin size for printing for use may be identified or selected by calculation.

Next, the device control module 29 outputs the information related to the calculated resolution and the margin size to the manager 30 as the capability information (S162). Then, the manager 30 outputs the capability information received from the device control module 29 to the edit screen control module 27 (S164). Next, the edit screen control module 27 outputs the creation instruction of the image data designating the margin size and the resolution included in the capability information to the image data creating module 28 (S166). It is noted that the creation instruction of the image data may include information indicating the margin size and the resolution.

When receiving the creation instruction of the image data designating the calculated resolution and the margin size, the image data creating module 28 creates the image data (which is an example of first output image data) in which the designated resolution and the margin size are reflected in the vector format (S167). Next, the image data creating module 28 converts the created vector format image data to the raster format image data (S168). It is noted that the image data creating module 28 may be configured to obtain the setting information output by the edit screen control module 27 in S128 and use the thus obtained setting information for creating or converting the image data. Further, the image data creating module 28 may be configured to obtain the information output by the edit screen control module 27 in S132 or S144, and use the same for creating or converting the image data.

Next, the image data creating module 28 outputs the raster format image data to the edit screen control module 27 (S170). Then, in response to receipt of the image data, the edit screen control module 27 outputs the image data to the manager 30 (S172). It is noted that the edit screen control module 27 also outputs the setting information, which is stored in the memory 14 in association with the image data, to the manager 30.

Next, the manager 30 outputs a confirmation instruction of a status of the selected printer to the device control module 29 (S147). Upon receipt of the confirmation instruction, the device control module 29 communicates with the selected printer through the network I/F 20 and checks the status of the selected printer (S176). Concretely, the device control module 29 receives information indicating the status of the selected printer. Further, the device control module 29 creates status information for transmitting the status of the selected printer to the manager 30. For example, when the selected printer is in a printable status, the device control module 29 creates the status information indicating that the printer is available, while, when the selected printer is in a state where printing cannot be performed, the device control module 29 creates the status information indicating that the selected printer is not available. Then, the device control module 29 outputs the crated status information to the manager 30 (S178).

Next, the manager 30 checks the status of the selected printer based on the status information received from the device control module 29 (S180). When the status information indicates that the selected printer is available, the manager 30 outputs the image data and the setting information to the device control module 29 (S182). In response to receipt of the image data, the device control module 29 executes a sending-to-printer subroutine (S184).

In the sending-to-printer subroutine shown in FIG. 7, the device control module 29 creates, based on the setting information, the printing image data corresponding to the received image data (which is an example of second output image data) (S320). At this stage, the device control module 29 creates the printing image data in a format printable by the printer 50. Next, the device control module 29 converts the created printing image data to the image data for transmission (S322). For example, the device control module 29 divides the printing image data for each line that is printable by the printer 50, and add a command for executing printing in accordance with the setting information for each piece of the divided image data. Then, the device control module 29 transmits each piece of image data which has been divided and added with the command to the selected printer (S324). Then, the sending-to-printer subroutine is terminated. It is noted that the selected printer which has received the image data executes the print process for each line in accordance with the command added to the image data.

As mentioned above, when receiving the detection instruction of the printer communicatable with the PC 10 from the edit screen control module 27 (FIG. 3: S100), the manager 30 outputs the detection instruction not only to the device control module 29, but also to the general purpose print module 17 of the OS 32 (S103). The general purpose print module 17 receives the detection instruction executes a process similar to steps S102-S106 executed by the edit screen module 27. For example, the general purpose print module 17 obtains the basic printer information stored, by the OS 32, in the data storage area 34, and outputs a list of the basic printer information to the manager 30. The OS 32 selects the printer to be used for printing by the general purpose print module 17 from among candidate printers connected through the network I/F 20. The OS 32 stores the basic printer information of the candidate printers in the data storage area 34.

As described above, the manager 30 outputs the list of the basic printer information output by the device control module 29 and the list of the basic printer information output by the general purpose print module 17 to the edit screen control module 27 (S108). The edit screen control module 27 displays the printer selection screen on the LCD 16 based on the both lists of the basic printer information (S110).

A case where the printer indicated by the basic printer information output by the general purpose print module 17 is selected as the selected printer by the user operation (S112) is different from a case where the printer indicated by the basic printer information output by the device control module 29 is selected as the selected printer by that the edit screen control module 27 displays the edit screen 100 as shown in FIG. 8 on the LCD 16 based on the basic printer information without executing steps S114-S122 (S124).

The general purpose print module 17 does not have a high-performance function of obtaining the printer information as is provided to the device control module 29. It is because the general purpose print module 17 is an OS standard general purpose module, and is different from the device control module 29 which is optimally designed directed to the printers 50 and 51 which are products of a particular vender. Therefore, the edit screen control module 27 obtains only the basic printer information and does not obtain the printer information other than the basic printer information from the general purpose print module 17. It is noted that there could be a configuration where the edit screen control module 27 executes S114, while the manger 30 makes a reply to indicate that the manger 30 cannot obtain the information, and the edit screen control module 27 executes S124.

It is noted that the process of S126-S154 is basically the same as the process when the printer indicated by the basic printer information output by the device control module 29 is selected as the selected printer, description thereof will be omitted.

In a state where the printer indicated by the basic printer information output by the general purpose print module 17 is selected as the selected printer, when the print button 120 is operated on the edit screen 100 (S154), the edit screen control module 27 outputs the creation instruction of the image data to the image data creating module 28 (S166) without executing the process of S158-S164. That is, the creating instruction of the image data does not designate the resolution and the margin size calculated by the device control module 29. In response to receipt of the creation instruction of the image data, the image data creating module 28 creates the image data reflecting the resolution and the margin size indicated by the setting information output by the edit screen control module 27 in S128 in the vector format (S247).

In a case where the creation instruction of the image data does not designate the resolution and the margin size calculated by the device control module 29, the image data creating module 28 may create the image data reflecting the resolution and the margin size suitable to the process performed by the general purpose print module 17. Further, in a case where a printer indicated by the basic printer information output by the general purpose print module 17 is selected as the selected printer, the edit screen control module 27 may output the creation instruction designating the resolution and the margin size suitable to the process by the general purpose print module 17 to the image data creating module 28.

The following process does not have a substantial difference from the process when a printer indicated by the basic printer information output by the device control module 29 is selected as the selected printer, the description thereof will be omitted.

As described above, according to the printer system 1, when the print process is performed by the printer 50, the device control module 29 communicates with the printer 50 to obtain the printer information from the printer 50, and the edit screen 100 is created based on the printer information. According to the above configuration, it becomes possible to reflect the status of the printer 50 of which status changes dynamically on the edit screen 100, and create the edit screen 100 corresponding to the current status of the printer 50. The device control module 29 communicates with the printer 50, obtains the capability information from the printer 50. Then, the image data creating module 28 creates the image data based on the capability information. Thus, it is possible to create the image data fully utilizing the capability of the printer 50.

It is noted that the printer 51 is unable to perform the print process utilizing the device control module 29. However, by utilizing the general purpose print module 17, it is possible to perform the print process using the printer 51.

The application program 26 for performing the print process by the printer 50 is configured by the edit screen control module 27, the image data crating module 28, and the device control module 29. The edit screen control module 27 is a program functions to display a screen such as an edit screen 100, which is used to create an image when the image data is being created, and the like on the LCD 16. Further, the image data creating module 28 is a program to create image data in accordance with the instruction transmitted from the edit screen control module 27. The device control module 29 is a program which communicates with the printer 50 through the network I/F 20, obtains various pieces of information from the printer 50, transmits the print instruction to the printer 50, and the like. Accordingly, by developing the edit screen control module 27, the image data creating module 28 and the device control module 29 in parallel, an image creating process, an image displaying process, and a process of communicating with the printer 50 can be developed in parallel.

Further, by developing the edit screen control module 27, the image data creating module 28 and the device control module 29 individually, the image data creating module 28 and the device control module 29 in parallel, an image creating process, a displaying image, and communication with the printer 50 can be developed individually. That is, when there is a process which has already been developed, it is possible, by diverting the program for the developed process, to develop programs only for the undeveloped processes. Therefore, it becomes possible to develop the application program 26 effectively.

Effects of Illustrative Embodiment

The edit screen control module 27 outputs the output instruction information instructing output of the printer information related to the printer 50, which is communicatable through the network I/F 20, to the device control module 29. When receiving the output instruction information, the device control module 29 communicates with the printer 50 through the network I/F 20 to obtain the printer information, and to output the printer information to the edit screen control module 27. When receiving the printer information, the edit screen control module 27 displays the printer information on the LCD 16. Thus, it becomes possible that the user browses the printer information, which dynamically varies, of the selected printer.

When arbitrary printer information is selected from among a plurality of pieces of the printer information displayed on the LCD 16, the edit screen control module 27 outputs the selected printer information and the creation instruction of the display image data to the image data creating module 28. The image data creating module 28 creates the image data based on the received printer information. As above, the print process corresponding to the dynamically varying printer information of the selected device can be performed.

The edit screen control module 27 outputs the output instruction information instructing output of printer identifying information of the printer, which is communicatable through the network I/F 20, to the device control module 29. The device control module 29 outputs the printer identifying information to the edit screen control module 27 based on the output instruction information. When arbitrary printer is selected from among the printers identified by the printer identifying information, the edit screen control module 27 outputs the creation instruction instructing creating the display image data corresponding to the selected device to the image data creating module 28. The image data creating module 28 creates the display image data corresponding to the selected device in accordance with the creation instruction. Thus, the image data corresponding to the selected printer can be created.

The edit screen control module 27 outputs the output instruction information instructing output of the identifying information identifying printers communicatable through the network I/F 20 to the general purpose print module 17. The general purpose print module 17 outputs the printer identifying information to the edit screen control module 27 in accordance with the output instruction. When an arbitrary one of the printers identified by the identifying information is selected as the selected printer, the edit screen control module 27 outputs the creation instruction instructing to create the display image data corresponding to the selected device to the image data creating module 28. The image data creating module 28 creates the display image data corresponding to the selected device in accordance with the creation instruction information. Thus, the print process to be executed by the device (e.g., the printer 51), which the device control module 29 cannot handle, can be performed with use of the general purpose print module 17.

When the sheet size which is printable by the selected printer is selected, the edit screen control module 27 outputs first creation instruction information instructing creation of the display image data corresponding to the selected sheet size to the image data creating module 28. The image data creating module 28 creates the display image data corresponding to the selected sheet size in accordance with the creation instruction information. Thus, the image data corresponding to the sheet size can be created.

When the operation to indicate the print instruction is input, the edit screen control module 27 outputs output instruction information instruction output of the capability information indicating the capability of the selected printer to the device control module 29. The device control module 29 outputs the capability information to the edit screen control module 27 in accordance with the output instruction information. Upon receipt of the capability information, the edit screen control module 27 outputs the creation instruction instructing creation of the image data based on the received capability information to the image data creating module 28. In accordance with the creation instruction, the image data creating module 28 creates the image data based on the capability information. Thus, the image data corresponding to the capability of the selected printer can be created.

The device control module 29 communicates with the printer 50 through the network I/F 20, obtains the capability information from the printer 50, and outputs the obtained capability information to the edit screen control module 27. Thus, the image data reflecting the dynamically changing capability information of the selected printer can be created.

It is noted that the aspects of the present disclosures need not be limited to the above-described illustrative embodiment, but can be modified or embodied in various ways based on the knowledge of person skilled in the art. For example, according to the above-described embodiment, the edit screen control module 27 has the manager 30, and reception from or transmission to the device control module 29 and the general purpose print module 17 is performed through the manager 30. Such a configuration may be modified such that reception from or transmission to the device control module 29 and the general purpose print module 17 may be performed without using the manager 30.

According to the above-described embodiment, the image data creating module 28 creates the vector format image data, and converts the vector format image data to the raster format image data. Such a configuration may be modified such that a module other than the image data creating module 28 converts the vector format image data to the raster format image data. For example, the image data creating module 28 may create the vector format image data, while the device control module 29 may create the print image data corresponding to the image data output by the image data creating module 28 in the raster format.

In the foregoing description, an example in which the CPU 12 executes the processes shown in FIGS. 2-7 is described. It is noted that all the processes may not be executed by the CPU 12. These processes may be executed by ASIC, other logical IC(s), or a combination thereof.

What is claimed is:

1. A non-transitory computer-readable medium for an information processing apparatus having a user interface, a network interface, a display and a controller, the non-transitory computer readable medium storing instructions realizing an edit screen control module, an image data creating module and a first device control module, the edit screen control module causing, when executed, the controller to output, when the controller receives an operation input through the user interface as an edit instruction input, a first creation instruction information to the image data creating module, the first creation instruction information being information instructing creation of display image data, the display image data is image data indicating an image including an object edited in accordance with the edit instruction input, the image data creating module causing, when executed, the controller to create, in accordance with the first creation instruction information which is output as the controller is caused to output by the edit screen control module, the display image data and output the display image data to the edit screen control module, the edit screen control module causing, when executed, the controller to display, when the display image data, which is created as the controller is caused to create by the image data creating module, is received after the first creation instruction information is output, a display image based on the display image data on the display, and when the operation input received through the user interface after displaying the display image is a device usage instruction input, output second creation instruction information to the image data creating module, the second creation instruction information being information instructing creation of first output image data corresponding to the display image data, the first output image data being image data used to create second output image data in the first device control module, the image data creating module causing, when executed, the controller to create, in accordance with the second creation instruction information which is created as the controller is caused to output by the edit screen control module, the first output image data and output the first output image data to the edit screen control module, the edit screen control module causing, when executed, the controller to output, when the first output image data which is output as the controller is caused to create by the image data creating module is received after the second creation instruction information is output, first output instruction information to the first device control module, the first output instruction information being information instructing output of the second output image data, and the first device control module causing, when executed, the controller to create, in accordance with the first output instruction information which is output as the controller is caused to output by the edit screen control module, the second output image data corresponding to a selected device and output the second output image data to the selected device through the network interface, the selected device being selected as an output target of the second output image data from among a plurality of corresponding devices, the plurality of corresponding devices being a device to which the first device control module is conformable.

2. The non-transitory computer-readable medium according to claim 1, wherein the edit screen control module causes, when executed, the controller to output second output instruction information instructing output of device information related to a device communicatable through the network interface to the first device control module, wherein the first device control module causes, when executed, the controller to communicate with the device through the network interface and obtain the device information when the second output instruction information is received, and wherein the edit screen control module causes, when executed, the controller to display the device information on the display when the device information output by the edit screen control module is received.

3. The non-transitory computer-readable medium according to claim 1, wherein the edit instruction input is an operation input to select arbitrary device information from among a plurality of pieces of device information displayed on the display, the edit screen control module causes the controller to output the device information selected by the edit instruction input and the first creation instruction information to the image data creating module, and wherein the image data creating module causes the controller to create the display image data in accordance with the output device information.

4. The non-transitory computer-readable medium according to claim 1, wherein the edit screen control module causes, when executed, the controller to output second output instruction information instructing output of identification information of devices communicatable through the network interface to the first device control module, wherein the first device control module causes, when executed, the controller to output the identification information in accordance with the second output instruction information output by the edit screen control module to the edit screen control module, wherein, when the edit instruction input is an operation input to select an arbitrary device as a selected device from among devices identified by the identification information output by the first device control module, wherein the edit screen control module causes, when executed, the controller to output the first creation instruction information instructing creation of the display image data corresponding to the selected device selected based on the edit instruction input to the image data creating module, and wherein the image data creating module causes, when executed, the controller to create the display image data corresponding to the selected device in accordance with the first creation instruction information output by the edit screen control module.

5. The non-transitory computer-readable medium according to claim 4, wherein, the edit instruction input is an operation input to select a sheet size printable by the selected device, wherein the edit screen control module causes, when executed, the controller to output the first creation instruction information instructing creation of the display image data corresponding to the sheet size selected by the edit instruction input, and wherein the image data creating module causes, when executed, the controller to create the display image data corresponding to the sheet size selected by the edit instruction input in accordance with the first creation instruction information output by the edit screen control module.

6. The non-transitory computer-readable medium according to claim 4, wherein the edit screen control module causes, when executed, the controller to output third output instruction information instructing output of capability information indicating capability of the selected device to the first device control module when the device usage instruction input is an operation input indicating a print instruction, wherein the first device control module causes, when executed, the controller to output the capability information to the edit screen control module in accordance with the fifth-third output instruction information as output, wherein the edit screen control module causes, when executed, the controller to receive the capability information as output, wherein the edit screen control module causes, when executed, the controller to output the second creation instruction information instructing creation of the first output image data based on the capability information as received to the image data creating module, and wherein the image data creating module causes, when executed, the controller to create the first output image data based on the capability information in accordance with the second creation instruction information as output.

7. The non-transitory computer-readable medium according to claim 6, wherein the first device control module causes, when executed, the controller to:

obtain the capability information by communicating with the device through the network interface when the third output instruction information is received; and output the capability information as obtained to the edit screen control module.

8. The non-transitory computer-readable medium according to claim 1, wherein the edit screen control module causes, when executed, the controller to output second output instruction information instructing output of identification information of devices communicatable through the network interface to a second device control module, wherein the second device control module causes, when executed, the controller to output the identification information to the edit screen control module in accordance with the second output instruction output by the edit screen control module, wherein, when the edit instruction input is an operation input to select an arbitrary device as a selected device from among the devices identified by the identification information output by the second device control module, wherein the edit screen control module causes, when executed, the controller to output the first creation instruction information instructing creation of the display image data corresponding to the selected device selected by the edit instruction input to the image data creation creating module, and wherein the image data creating module causes, when executed, the controller to create the display image data corresponding to the selected device in accordance with the first creation instruction information output by the edit screen control module.

9. A non-transitory computer-readable medium for an information processing apparatus having a user interface, a network interface, a display and a controller, the non-transitory computer readable medium storing instructions realizing an edit screen control module, the controller being configured to read an image data creating module and a device control module, the edit screen control module causing, when executed, the controller to output first creation instruction information instructing creation of display image data to the image data creating module when the controller receives an operation input through the user interface as an edit instruction input, the display image data is image data indicating an image including an object edited in accordance with the edit instruction input, the edit screen control module causing, when executed, the controller to:

display a display image based on the display image data on the display when the display image data output by the image data creating module is received after the first creation instruction information is output;

when the operation input received through the user interface is a device usage instruction input, output second creation instruction information instructing creation of first output image data corresponding to the display image data created by the image data creating module to the image data creating module, the first output image data being image data used to create second output image data in the device control module; and when the first output image data output by the image data creating module is received after the second creation instruction information is output, output first output instruction information instructing output of the second output image data to the device control module, wherein the edit screen control module causes, when executed, the controller to output second output instruction information instructing output of device information related to a device communicatable through the network interface to the device control module, and wherein the edit screen control module causes, when executed, the controller to display the device information on the display when the device information output by the edit screen control module is received.

10. A method of controlling an information processing apparatus having a user interface, a network interface, and a display, the method including:

outputting, in response to receipt of an edit instruction input through the user interface, first creation instruction information instructing creation of display image data, the display image data being image data indicating an image including an object edited in accordance with the edit instruction input, creating, in accordance with the first creation instruction information, the display image data, displaying, when the display image data is received after the first creation instruction information is received, a display image based on the display image data on the display, when an operation input received through the user interface after displaying the display image is a device usage instruction input, outputting second creation instruction information instructing creation of first output image data corresponding to the display image data used to create second output image data, creating, in accordance with the second creation instruction information, the first output image data and outputting the first output image data, outputting, when the first output image data is output after the second creation instruction information is output, output instruction information instructing output of the second output image data, and creating, in accordance with the output instruction information, the second output image data corresponding to a selected device and outputting the second output image data to the selected device through the network interface, the selected device being a device selected as an output target of the second output image data from among a plurality of corresponding devices.

11. An information processing apparatus having a user interface, a network interface, a display, a memory and a controller, the memory storing programs realizing an edit screen control module, an image data creating module and a device control module, the edit screen control module causing, when executed, the controller to output, when the controller receives an operation input through the user interface as an edit instruction input, first creation instruction information to the image data creating module, the first creation instruction information being information instructing creation of display image data, the display image data is image data indicating an image including an object edited in accordance with the edit instruction input, the image data creating module causing, when executed, the controller to create, in accordance with the first creation instruction information which is output as the controller is caused to output by the edit screen control module, the display image data and output the display image data to the edit screen control module, the edit screen control module causing, when executed, the controller to display, when the display image data, which is created as the controller is caused to create by the image data creating module, is received after the first creation instruction information is output, a display image based on the display image data on the display, and when the operation input received through the user interface after displaying the display image is a device usage instruction input, output second creation instruction information to the image data creating module, the second creation instruction information being information instructing creation of first output image data corresponding to the display image data, the first output image data being image data used to create second output image data in the first device control module, the image data creating module causing, when executed, the controller to create, in accordance with the second creation instruction information which is created as the controller is caused to output by the edit screen control module, the first output image data and output the first output image data to the edit screen control module, the edit screen control module causing, when executed, the controller to output, when the first output image data which is output as the controller is caused to create by the image data creating module is received after the second creation instruction information is output, output instruction information to the device control module which is information instructing output of the second output image data, and the device control module causing, when executed, the controller to create, in accordance with the first output instruction information which is output as the controller is caused to output by the edit screen control module, the second output image data corresponding to a selected device and output the second output image data to the selected device through the network interface, the selected device being a device selected as an output target of the second output image data from among a plurality of corresponding devices, the plurality of corresponding devices being a device to which the device control module is conformable.

* * * * *

UNITED STATES PATENT AND TRADEMARK OFFICE
CERTIFICATE OF CORRECTION

PATENT NO. : 10,574,842 B2  
APPLICATION NO. : 16/022093  
DATED : February 25, 2020  
INVENTOR(S) : Matsuo Page 1 of 1

It is certified that error appears in the above-identified patent and that said Letters Patent is hereby corrected as shown below:

In the Claims

Column 22, Claim 6, Line 13:  
Delete "fifth-third output" and insert --third output--

Column 24, Claim 11, Line 63:  
Delete "first output" and insert --output--

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*